United States Patent [19]

Jache

[11] 3,708,338

[45] Jan. 2, 1973

[54] THE NEGATIVE ELECTRODES FOR A DRY-CHARGED LEAD ACID STORAGE BATTERY

[76] Inventor: Otto Jache, Thiergarten, Budings/ Hessen, Germany

[22] Filed: Dec. 27, 1971

[21] Appl. No.: 212,259

Related U.S. Application Data

[62] Division of Ser. No. 70,245, Sept. 9, 1970, Pat. No. 3,658,594.

[52] U.S. Cl. ............................... 136/27, 136/78
[51] Int. Cl. ............................... H01m 35/00
[58] Field of Search ............... 136/26–27, 76–78, 136/34–35, 3, 6, 19, 154, 161, 66, 67, 127, 147

[56] References Cited

UNITED STATES PATENTS

| 2,759,037 | 8/1956 | Greenburg et al. | 136/26 |
| 2,942,050 | 6/1960 | Denes | 136/3 |
| 2,996,563 | 8/1961 | Haebler | 136/27 |

*Primary Examiner*—Anthony Skapars
*Attorney*—Shlesinger, Fitzsimmons & Shlesinger

[57] ABSTRACT

A lead-acid storage battery of the dry-charged type is disclosed in which the dry-charged negative electrodes are provided with a coating of a silicone containing anion-active emulsifying agent.

5 Claims, 3 Drawing Figures

THE NEGATIVE ELECTRODES FOR A DRY-CHARGED LEAD ACID STORAGE BATTERY

This is a division of application Ser. No. 70,245, filed Sept. 9, 1970, now Pat. No. 3,658,594.

The invention relates to a lead-acid storage battery of long shelf life which can be made ready for use by being filled with sulphuric acid, the negative electrode or electrodes of the battery are dry-charged and provided with a coating for protection from oxidization.

The invention relates furthermore to the processing of negative electrodes of a lead-acid storage battery of the kind described, the process including treating the electrodes after they have been activated by formation, with a liquid in which a polymer is dispersed, whereupon the electrodes are dried for the purpose of forming thereon a protective coating consisting of that polymer.

It is known to manufacture dry-charged negative electrodes by subjecting the negative electrodes to a well known electrolytic formation treatment in sulphuric acid after which the active mass of the negative electrodes consists of very finely divided electrochemically active elemental lead. The formed negative electrodes are then washed to remove adhering sulphuric acid and thereafter dried. To protect the active mass of the negative electrodes from oxidization the drying process is carried out under vacuum or in an inert gas atmosphere or in an inert liquid which is not miscible with water and has a higher boiling point than water. The active mass of the negative electrodes fully retains its electrochemical activity through preventing oxidization which otherwise occurs if drying is carried out in the air.

It is possible to make storage batteries capable of supplying electric current immediately after they have been filled with sulphuric acid of usual concentration as the electrolyte, by using in these batteries dry-charged negative electrodes and positive electrodes having its active mass in an oxidized state. The manufacture of such charged positive electrodes does not present any difficulties. The time during which such dry-charged lead-acid storage battery is capable of supplying current, and the ratio of the actual current output to the real capacity of the battery after a previous full charging by a charging unit, depends essentially on the activity of the dried active mass of the negative plates and their degree of oxidization.

It is furthermore known that the very finely distributed elemental lead, of which the active mass of the negative electrodes consists, oxidizes in air in a relatively short time, and thereby becomes inactive, in particular if the air is humid which can never be avoided entirely. The originally active mass of the negative plates changes by oxidization its dry-charged state into the dry-uncharged state and thus loses its capability to supply current.

There have been numerous proposals to prevent by a protective coating, the oxygen and the humidity in the air attacking the active mass of the negative electrodes which tends to become oxidized. These proposals include impregnating substances having the property of impeding specifically the oxidization of lead, such as glycerine, boric acid, phenol, cresol or other organic substances with alcoholic or phenolic groups. Further proposals include substances capable of forming a protective film, such as for instance, oils, fats, waxes, natural or synthetic resins, hardened gelatine or plastics materials, such as for instance, polymers of ethylene derivatives, in particular styrene polymers, vinyl polymers or acrylic polymers. The known processes for applying the protective coatings generally use the proposed substances in the form of solutions, dispersions or emulsions into which the negative electrodes are dipped, the protective coating being formed during the subsequent drying process by evaporation of the volatile components of the impregnating medium used.

All the substances so far used in practice or proposed as means for preventing oxidization have drawbacks of different kinds which limit in numerous ways, the practical usefulness of the dry-charged lead-acid storage batteries so far commercially available. If the impregnating medium produces a protective coating fully resistant to oxygen and humid air thereby guaranteeing a long shelf life of the negative plates or the battery, then the protective coating can be decomposed and removed only very slowly by the sulphuric acid added to the battery to put it into service. If, on the other hand, the protective coating can be rapidly decomposed and removed by the sulphuric acid, then a long shelf life is impossible because the attack by the oxygen in the air on the coating begins to become perceptible. There is also the particular short-coming of the protective substances so far known being removable only by a sulphuric acid filled into the battery at temperatures above 0° C., so that activation of the battery at winter temperatures, to which a battery provided in a motor car for starting, lighting and ignition is particularly exposed, is usually not possible without additional charging by a charging unit. The last-mentioned drawback found its expression in the directions for the putting into operation of batteries for motor vehicles issued by their manufacturers, these directions including at present a warning to the effect that dry-charged batteries have to be put into proper operational condition by being connected first to a conventional charging unit, whenever the temperature is below freezing point.

It is an object of the present invention to provide a lead-acid storage battery of the dry-charged type which has a long shelf life and which supplies electric current upon filling with sulphuric acid electrolyte.

It is a further object of the invention a dry-charged negative electrode for use in lead-acid storage batteries which is provided with a thin coating adapted to protect the active material of the electrode from oxidation and to be easily removed upon addition of sulphuric said electrolyte.

It is another object of the invention to provide a method of preparing dry-charged negative electrodes having improved characteristics.

It has surprisingly now been found that the above-mentioned short-comings do not occur if the protective coating consists of a silicone, containing an anion-active emulsifying agent, and that such a coating protects the dry-charged negative electrodes in a perfect manner from attack by oxygen and the humidity in the air, thereby guaranteeing a long shelf life. On the other hand, a protective coating of silicone, containing an anion-active emulsifying agent can be completely removed in a relatively short time by sulphuric acid, having a specific gravity of 1.28, filled into the accumulator for the purpose of making it operable, and this even at temperatures below 0° C.

In accordance with a feature of the present invention a lead-acid storage battery of the dry-charged type which is ready for operation upon addition of sulphuric acid electrolyte, comprises a container surrounding at least one positive electrode with its active mass in an oxidized state, and at least one dry-charged negative electrode spaced from said positive electrode and coated with a silicone containing an anion-active emulsifying agent.

A lead-acid storage battery according to the invention of the type referred to above has therefore a coating for the protection of the negative electrodes from oxidization, the coating consisting of a silicone, containing an anion-active emulsifying agent. Protective coatings which have been found particularly suitable, consist of a silicone resin — especially a methyl-silicone resin— and containing an anion-active emulsifying agent. An emulsifying agent of the fatty alcoholic polyglycol ether type has been found to be particularly suitable.

It is known that silicone resins, silicone fats and silicone oils are among the most stable hydrophobic substances. It is generally known that it is extremely difficult to remove a silicone from a surface which at one time has been treated with it. It is therefore most surprising that a protective coating consisting of a silicone containing an anion-active emulsifying agent is detached from the surface of the negative electrodes only a short time after the coating has been brought into contact with sulphuric acid. It is assumed that the anion-active emulsifying agent contained in the protective coating enables the sulphuric acid to re-emulsify the silicone and to detach it thereby from the surface and to remove it.

According to a further feature of the invention, there is used for applying a protective coating to dry-charged negative electrodes of a lead-acid storage battery, an aqueous emulsion of a silicone solution, in particular of a silicone resin solution containing an anion-active emulsifying agent. In the process according to the invention, the negative electrodes which have been activated by formation, are treated with this aqueous emulsion, after the sulphuric acid adhering from the formation process has been removed by washing, preferably by dipping, the electrodes being subsequently dried in a protective gas or under vacuum or whilst dipped into an inert liquid which is not miscible with water and has been heated above the boiling point of water. It is preferred to use an aqueous emulsion of a solution of methyl-silicone resin in xylene or toluene, the emulsion having been stabilized by a fatty alcoholic polyglycol ether. It appears that the solvent which is present enables the silicone in solution to form a film and to ensure also at the same time uniform distribution over the surface of the treated negative electrodes. Emulsions having a resin content of 0.02 – 6.4 percent by weight have been found to be suitable, emulsions having a resin content of 0.4 – 3.2 percent by weight being preferred. Emulsions of the kind mentioned are also resistant to any sulphuric acid which may adhere to the formed negative electrodes and they do not lose thereby their effectiveness. The emulsion can, if necessary, be diluted beyond the limits stated above. In the case of emuslions with a higher resin content, electrodes are obtained which are particularly resistant to the influence of humidity. The protection of the electrodes can be increased to such an extent that they can be immersed into water without the risk of being wetted or becoming oxidized when exposed to air afterwards. Lead-acid storage batteries having electrodes with those characteristics can be put into operation after being filled with sulphuric acid and without any additional charging.

In the drawings

The invention will now be described in more detail with reference to an example.

Immersion baths of different resin concentrations are prepared by diluting a commercially available silicone resin emulsion containing an anion-active emulsifying agent with water. The used silicone resin emulsion with an anion-active emulsifying agent is sold by the German firm Bayer under the name "Bayer LA" as a medium for impregnating plaster, masonry and stones, and represents a 40 percent by weight aqueous emulsion of a 50 percent by weight solution of methyl-silicone resin in xylene, the anion-active emulsifying agent being of the fatty alcohol polyglycol ether type with imparts to the emulsion a negative Zeta-potential. The immersion baths prepared in that way contain per liter 1, 3, 5, 10, 20, 40, 80, 160 or 320 grams of this 40 percent emulsion of a 50 percent solution of methyl-silicone resin in xylene. Negative electrode plates for starter batteries were formed in the usual manner, subsequently washed in water for the removal of any sulphuric acid adhering from the forming process, dipped for about 20 minutes in one of the immersion baths and subsequently dried in the absence of oxygen. The dried negative plates had a film-like protective coating of methyl silicone resin with a built-in emulsifying agent. In order to ascertain the resistance of these dry-charged negative plates provided with a protective coating against the effect of humidity, some of them were immersed for 15 seconds into distilled water at a temperature of 28° C, and others were immersed for a period of 60 seconds into distilled water at a temperature of 27° C. After dipping, the quantity of water absorbed by the plates was measured. The oxide content of the active mass of the negative plates was measured 20 hours after dipping. The readings taken are shown in FIGS. 1 and 2 in which the water absorbed and the oxide contents are indicated in percentages in relation to the grams of the 40 percent emulsion present per liter of the immersion bath used for applying the protective coating.

Curve A represents the lead oxide content and Curve B represents the water absorption of plates immersed for 15 seconds. Curve C represents the lead oxide content and Curve D represents the water absorption of plates immersed for 60 seconds.

Figure 1:
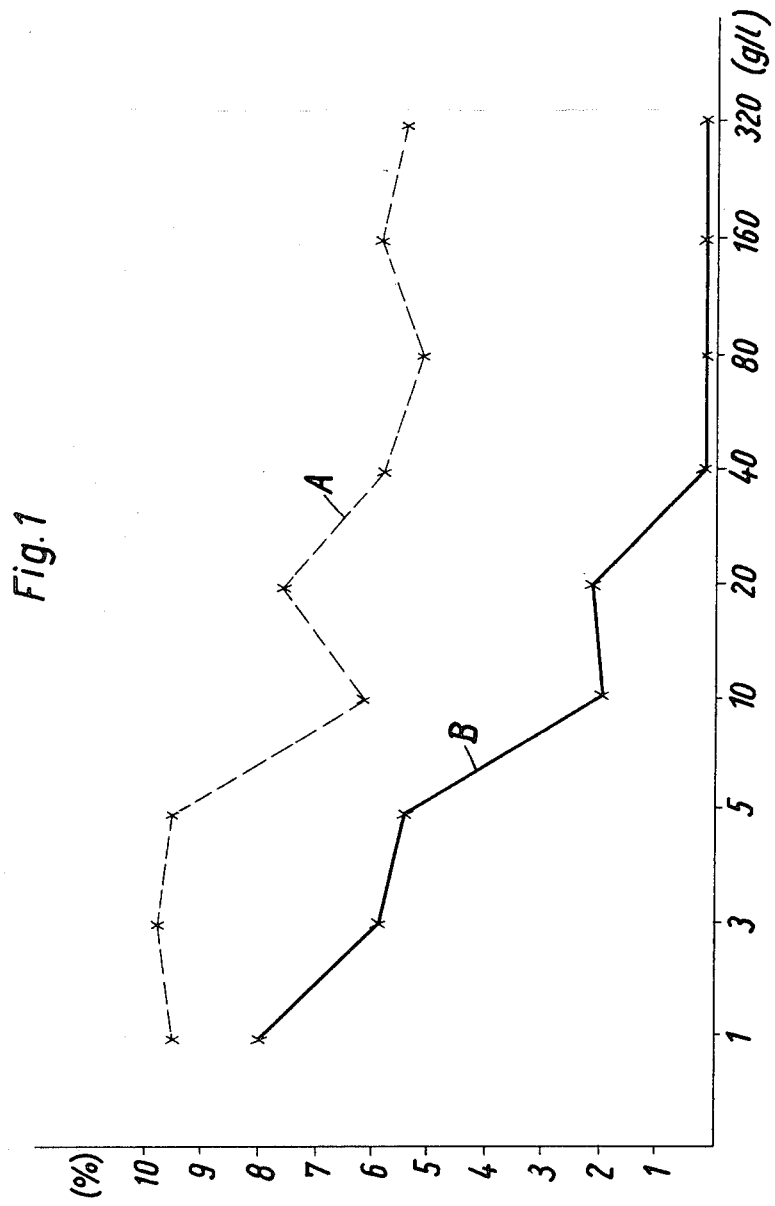
FIGS. 1 and 2 are graphs showing the relationship between the concentration of silicone resins in the immersion bath used for applying the protective coating, and the water content and the contents of lead oxide, respectively, of negative electrode plates, treated by the process according to the invention.
Figure 2:
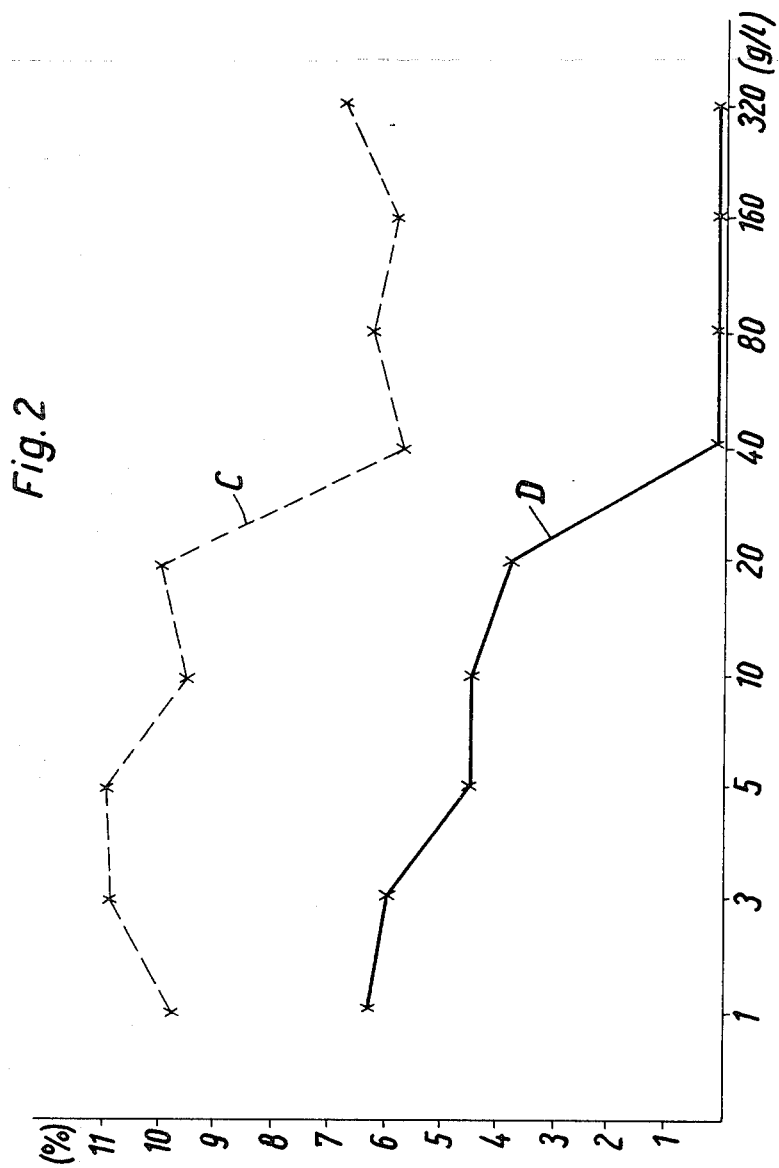

FIGS. 1 and 2 show that with immersion baths containing from 40 to 320 grams per liter of the emulsion used for their preparation, electrode plates are obtained which do not absorb water to any substantial extent and which hardly oxidize.

In order to prove that the protective coating is detached at temperatures below freezing point by sulphuric acid of a concentration generally used for the filling of lead-acid storage batteries cells were made having negative plates provided with a protective coating in the manner described. These cells were divided into three groups. The first group was heated to a temperature of 27° C., then filled with sulphuric acid and subsequently discharged by a current of three times the nominal capacity of the cells, until the terminal voltage which at the start was approximately 2.10 volts had dropped to 1.0 volts. The two other groups of accumulator cells were filled, after being cooled down to a temperature of −10° C, with sulphuric acid of −10° C and kept at a temperature of −10° C.

Figure 3:
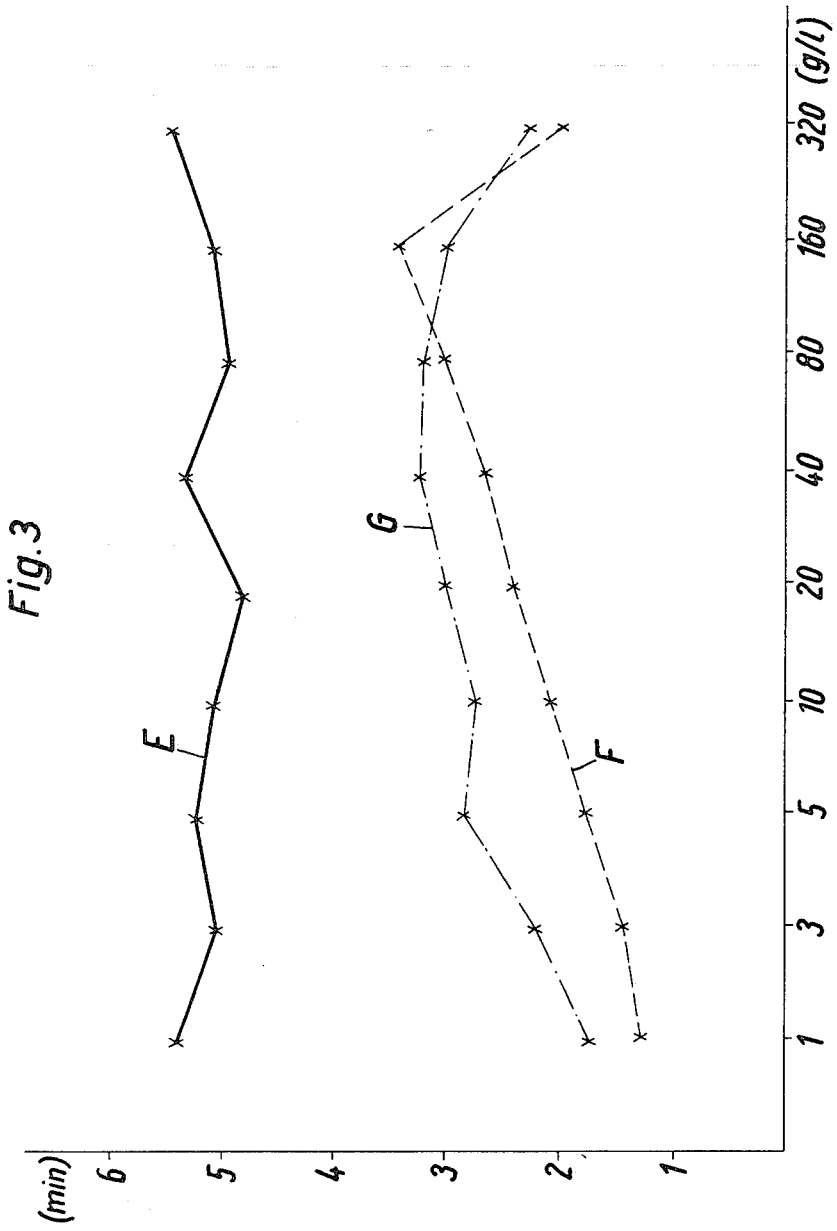
FIG. 3 is a graph showing the relationship between the concentration of silicone resin in the immersion bath used for applying the protective coating, and the discharge time of batteries with negative electrodes according to the invention.

The cells of the first of these two other groups were discharged 20 minutes, and those of the second group 2 hrs. after having been filled with sulphuric acid, until the terminal voltage had dropped to 1.0 volts, the discharge current being in both cases three times the nominal capacity of the cells. The graph in FIG. 3 illustrates the relationship between the concentration (grams of 40 percent emulsion per liter) of the immersion bath used for applying the protective coating to the negative plates and the time elapsing during discharge, before the terminal voltage had dropped to 1.0 volts. Curve E relates to the cells discharged at 27° C immediately after having been filled with sulphuric acid electrolyte. Curve F relates to the cells discharged at −10° C, 10 minutes after having been filled with sulphuric acid electrolyte. Curve G relates to the cells discharged at −10° C, 2 hours after having been filled with sulphuric acid electrolyte.

It can be seen from FIG. 3 that accumulator cells having negative plates treated by the process in accordance with the invention can be activated in a satisfactory manner by being filled with sulphuric acid at temperatures below freezing point, i.e., that the coating applied to the negative plates provided as a protection against oxidization can be decomposed and removed in a short while, even at temperatures below freezing point.

As can be seen from FIGS. 1–3, it is preferred to use immersion baths, containing per liter approximately 20–160 grams of a 40 percent emulsion of a 50 percent solution of methyl silicone resin in xylene, the emulsion containing also an anion-active emulsifying agent, the above corresponding to a silicone resin content in the region of 0.4 –3.2 percent by weight.

The following experiment was carried out in order to prove that the process according to the invention has no appreciable influence on the current storage capacity of the negative plates:

Positive and negative plates, formed in tanks, were welded together so as to form sets whilst still wet, after having been taken out of the formation, separated in groups of five positive and six negative plates and positioned in containers made of hard rubber, whereupon the containers were immediately filled with sulphuric acid. The acid was then adjusted to a density of 1.280 grams per liter. For the sake of comparison, positive and negative plates from the same tank formation were first washed, the negative plates impregnated according to the invention with an aqueous emulsion of a silicone resin solution having a resin content of 0.4 percent, and then dried in a protective gas. The dried plates were welded together in the same way as the above-mentioned plates so as to form sets, having the same numbers of positive and negative plates, separated and positioned into containers made of hard rubber. The containers were then filled with sulphuric acid having a density of 1.280 grams per liter.

Subsequently the cells made in that manner were subjected at 27° C to a discharge lasting 20 hrs. The cells having negative plates which were not treated had an average capacity of 56.4 amps. hrs. The cells having negative plates which were treated in accordance with the invention had an average capacity of 55 amps. hrs. The loss of capacity resulting from the treatment according to the invention is therefore only in the order of approximately 2.5 percent. This small loss in capacity is by far outweighed by the advantage of the substantially unlimited storage capability (shelf life) of the negative plates, treated in accordance with the invention.

What I claim is:

1. A method of preparing negative electrodes of a lead-acid storage battery of the dry-charged type, comprising the steps of subjecting said electrodes to an electrochemical formation treatment, treating the formed electrodes with an aqueous emulsion of a silicone solution containing an anion-active emulsifying agent, and then drying the electrodes to form thereon a protective coating of silicone containing an anion-active emulsifying agent.

2. A method of preparing negative electrodes as claimed in claim 1, wherein an aqueous emulsion of a solution of methyl-silicone resin in a solvent selected from the group consisting of xylene and toluene is used, and said emulsion is stabilized by an anion-active emulsifying agent.

3. A method of preparing negative electrodes as claimed in claim 2, wherein an emulsion with a resin content of 0.002–6.4 percent by weight is used.

4. A process of preparing negative electrodes as claimed in claim 2, wherein an emulsion with a resin content of 0.4–3.2 percent by weight is used.

5. A process of preparing negative electrodes as claimed in claim 2, wherein the emulsifying agent is a fatty alcoholic polyglycol ether type.

* * * * *